United States Patent

[11] 3,614,444

[72] Inventor Joseph C. Nirschl
West Long Branch, N.J.
[21] Appl. No. 777,722
[22] Filed Nov. 21, 1968
[45] Patented Oct. 19, 1971
[73] Assignee The United States of America as represented by the Secretary of the Army

[54] RADIATION SURVEY METER WITH DOSE RATE AND DOSIMETER READOUT
2 Claims, 1 Drawing Fig.

[52] U.S. Cl. .................................................. 250/83.6 R,
250/83.3 R, 330/110
[51] Int. Cl. ...................................................... G01t 1/18
[50] Field of Search ............................................ 250/83.6,
83.3; 330/97, 75, 86, 87, 110; 328/127, 128

[56] References Cited
UNITED STATES PATENTS
2,838,680 6/1958 Bender et al. ................. 250/83.6
2,874,354 2/1959 Bell .............................. 250/83.6 X
3,153,202 10/1964 Woolam ....................... 330/75

OTHER REFERENCES
Millman & Taub; Pulse, Digital & Switching Waveforms; McGraw-Hill Book Co., p. 15–17
Price; Nuclear Radiation Detection, McGraw-Hill Book Co., 1958; p. 92–95

Primary Examiner—James W. Lawrence
Assistant Examiner—Morton J. Frome
Attorneys—Harry M. Saragovitz, Edward J. Kelly, Herbert Berl and Daniel D. Sharp ABSTRACT: A radiation survey meter adapted to read either dose rate or dose and including a suitable operational amplifier connected to a radiation detector such as an ionization chamber and having a current meter in the output of said operational amplifier. The operational amplifier can be connected as an integrator when the current meter is to indicate dose. Alternatively, it can be connected as a current amplifier to indicate dose rate.

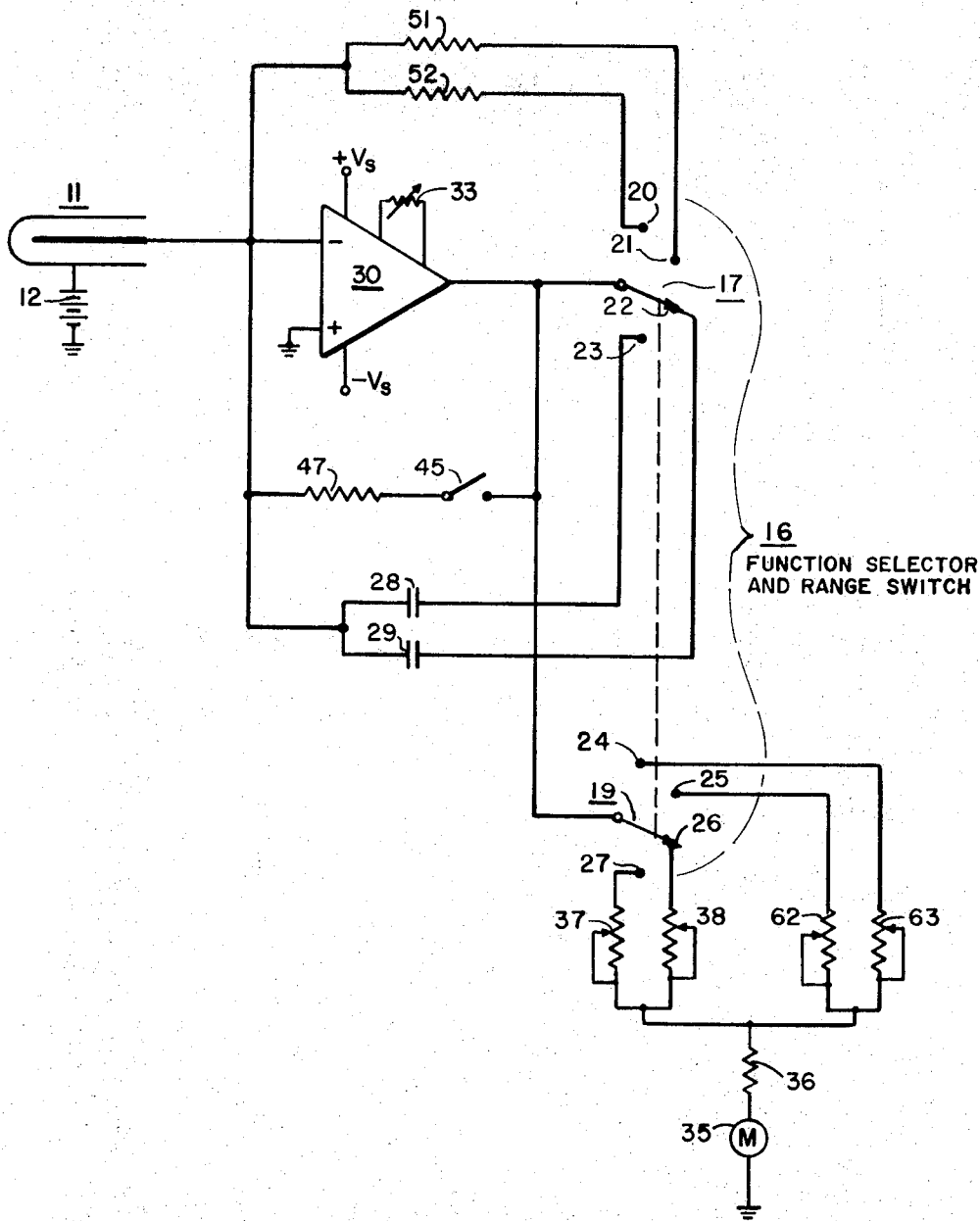

RADIATION SURVEY METER WITH DOSE RATE AND DOSIMETER READOUT

The invention described herein may be manufactured, used, and licensed by or for the Government for governmental purposes without the payment to us of any royalty thereon.

BACKGROUND OF THE INVENTION

The monitoring of nuclear radiation has usually involved devices which are restricted either to the measurement of radiation dose or to the measurement of radiation dose rate. The device of the invention is readily adapted to measurement of dose as well as to instantaneous measurement of the dose rate. This dual monitoring is accomplished using the same radiation detector and a common operational amplifier and output current meter. Switching means are included to alternatively insert either a capacitive or a resistive feedback path for the operational amplifier, depending upon whether integration is or is not desired.

Most dosimeters have been quartz fiber dosimeters in which a fiber is deflected in response to impingement of nuclear radiation; this type of dosimeter must be lifted up to the eye for viewing of the optically projected quartz fiber and scale graticule. This type of instrument is not suitable for dose rate measurement. Other types of dosimeters have used photographic or chemical techniques and, likewise, are not suitable for dose rate measurement.

In addition to providing capability of both dose rate and dose information in one small portable instrument, the survey meter of the invention can be read directly and simply, in terms of either dose or dose rate, on a small current meter.

SUMMARY OF THE INVENTION

This invention relates to a combined dosimeter and dose rate meter having a common radiation detector means such as a Geiger counter or ionization chamber, and an operational amplifier of high input impedance (e.g. of the MOSFET type) for receiving the current provided by said detector means, and a current meter in the output circuit of the operational amplifier. When dose rate is to be measured, a switch in the output circuit of the operational amplifier is arranged to connect a resistive network in the feedback path of the operational amplifier. The output of the operational amplifier is connected through appropriate calibration resistors to the current meter which may be calibrated in terms of dose rate. When the device is to be used as a dosimeter, the switch in the output circuit of the operational amplifier connects a capacitor in the feedback path of the operational amplifier, thereby forming an operational integrator circuit. The capacitor is charged by the current from the detector means. The output of the operational amplifier now is connected through separate calibrating resistors to the aforesaid current meter.

BRIEF DESCRIPTION OF THE DRAWING

FIG. 1 is a circuit diagram showing a radiation survey meter according to the invention.

DETAILED DESCRIPTION OF THE EMBODIMENT

The radiation survey meter of FIG. 1 includes a radiation detector 11, which may be an ionization chamber similar to the one used in quartz fiber dosimeter. Other forms of radiation detectors, such as a Geiger counter or solid-state detector, may be used, however. The detector is suitably biased, as by unidirectional power supply 12.

When operation as a dosimeter is desired, the contact arm 17 of function selector and range switch 16 is moved to either of the two poles 22 and 23, depending on the desired dosimenter range. In either case one of two capacitors 28 and 29 is connected in the feedback path of an operational amplifier 30. The operational amplifier, for example, may feature a MOSFET input stage to afford the required high input impedance ($>10^{15}$ ohms). The combination of the capacitors 28 or 29 and the operational amplifier 30 form a well-known operational integrator. The output circuit of the operational integrator includes a sensitive current meter 35 and a current-limiting resistor 36, as well as a selected potentiometer 37 or 38. The particular potentiometer desired is selected by the action of contact arm 19, which is ganged to contact arm 17. Contacts 20 through 23, for example, would typically represent one wafer (deck) of switch 16, and contacts 24 through 27 would represent a second wafer of the same switch, i.e. they are mechanically ganged, as indicated by the dashed line in FIG. 1. Thus, when contact arm 17 inserts one of the two capacitors into the feedback path of the operational amplifier, ganged arm 19 of switch 16 selects one of two calibration resistors 37 and 38 suitable for the corresponding capacitors 28 and 29, respectively.

Prior to exposure, momentary switch 45 is depressed by the operator to close the switch and to remove the capacitor charge built up on either capacitor 28 or 29; this is accomplished by providing a discharge path including the discharge resistor 47. At the same time the operational amplifier may be rezeroed via zero control 33, if required. The spring-loaded switch then is opened to remove the discharge resistor from the circuit, pending arrival of a new dose to be registered.

To facilitate explanation of the dosimeter circuitry, the use of two dose ranges of 1 rad and 10 rad will be assumed. Although two dose and dose rate ranges are indicated in the circuit of FIG. 1, it should be understood that a larger number of ranges can be used. The number of poles in the switch 16, and the number of capacitors or feedback resistors would be made equal to the number of desired meter ranges. Wen the ionization chamber 11 is placed in a radiation environment, an ionization current $I_c$ is produced which is a function of the radiation intensity. The current $I_c$, which charges the integrating capacitor 28 or 29 in the operational amplifier feedback loop, causes a corresponding rise in the voltage $V_c$ across this integrating capacitor. The capacitor is a low-leakage type, i.e. possesses a high insulation resistance of the dielectric material. Mylar, polycarbonate or glass capacitors, for example, are suitable. Similarly, switch 16 and switch 45 should have good insulating properties (e.g. ceramic wafers), to prevent loss of the charge accumulated on the integrating capacitor. An increase in radiation intensity is accompanied by an increase in the current $I_c$ and the voltage $V_c$. The input signal voltage to the operational amplifier 30 is applied to the inverting terminal so that the output voltage $e_o$ of the operational amplifier goes more negative with increases in radiation dose. The output voltage $e_o$ of the operational integrator circuit, consisting of the operational amplifier 30 and integrating capacitor 28 or 29, is given by $$e_o = -\frac{1}{C}\int_0^T I_c\, dt$$

where $C$ is the capacitance of the integrating capacitor and $T$ is the duration of the radiation exposure. Since $I_c$ is proportional to the dose rate R, the voltage $e_o$ obviously represents the total dose. The current $I_m$ in meter 35 in the low-impedance output circuit of the amplifier 30 depends upon the output voltage $e_o$ and, hence, the reading thereof provides an indication of dose.

If one uses a current meter in which 1 rad provides full-scale deflection for an output voltage $e_o$ equal to 2 volts (a representative voltage for driving a practical miniature taut-band-type microammeter), and if one assumes 12 cubic centimeter ionization chamber producing about $10^{112}$ ampere (1 picoammeter) per rad per hour, the capacitance value $C$ for the integrating capacitor 28 or 29 can be found by the relationship $$C = \frac{Q_c}{V_c} = \int \frac{i_c\, dt}{V_c} = \frac{I_c t}{V_c} = \frac{(1 \times 10^{-12})(3.6 \times 10^3)}{2}$$
$$= 1.8 \times 10^{-9}\ \text{farad} = 1800\ \text{picofarads}$$

A typical taut-band instrument drawing 25 microamperes has a resistance $R_m$ of about 20 kilohms. The voltage $V_m$ across the meter then would be $V_m = R_m I_m = (20 \times 10_3)(25 \times 10^1{}_6) = 500 \times 10^1{}_3 = 500$ mv.

The combined resistance $R_{TOT}$ in circuit with the meter 35 can be found by $$R_{TOT} = R_s + R_m = \frac{e_o}{I_m \text{(full scale)}} = \frac{2.0}{0.025} = 80 \text{ kilohms}$$

from which the series resistance $R_s$ is given by $$R_s = R_{TOT} - R_m = 80 \times 10^3 - 20 \times 10^3 = 60 \text{ kilohms}$$

This can be divided roughly into a fixed resistance equal to 47 kilohms and a potentiometer resistance of about 25 kilohms.

If one desires to read 10 rad at full-scale deflection of the current meter 35, another value of capacitance must be chosen. For the aforementioned ionization chamber, one would obtain $10 \times 10^{12}$ ampere for 10 rad per hour. The integrating capacitor now will have the value $$C = \frac{I_c t}{V_c} = \frac{(10 \times 10^{-12})(3.6 \times 10^3)}{2} = 18 \times 10^{-9} f. = 18000 pF.$$

When changing integrating capacitors, the tolerances may be such that it will be necessary to use different potentiometer settings which, once set, are usually left undisturbed. For this reason, means for switching in different potentiometers is provided.

When the dose has been read out, the switch 45 is closed to allow the selected integrated capacitor to discharge through the resistor 47 and the switch again opened.

When operating as a dose rate meter, contact arm 17 of function selector and range switch 16 is moved to pole 20 or 21. In this case, the ionization chamber 11 is still connected to the operational amplifier 30, but the integrating capacitor or capacitors is removed in favor of a selected one of two feedback resistors 51 and 52. The selection of one of these resistors is made by the function selector and range switch 16. The size of the resistors 51 and 52 will be dependent upon the dose rate range. Ganged to the arm 17 of switch 16 is the switch arm 19 which places one of two calibration resistors 62 and 63 in series to the meter 35. The separate calibrating resistors 62 and 63 must be provided to compensate for differences in the amplifier feedback resistors 51 and 52. As the radiation intensity changes, the output voltage of the operational amplifier 30 changes, in proportion to the ion chamber current and hence to the radiation intensity. The current flowing through the meter 35 now is a direct measure of the dose rate.

At any time, even during periods of radiation impingement upon the detector means, the meter 35 may be zeroed by closing the switch 45 and adjusting the operational amplifier zero control 33. The switch 45, when closed, places the resistor 47 of relatively low resistance in shunt with the resistors 51 and 52 of much higher resistance, thereby preventing a voltage from being established across resistors 51 and 52. In this way, the operator can be assured that radiation is not affecting the zeroing of the current meter 35.

What is claimed is:

1. A radiation survey meter comprising a radiation-detecting means productive of an input current representative of the radiation intensity, a high-impedance operational amplifier connected to said detecting means, a current meter in the output circuit of said operational amplifier, and switch means having at least one dose rate position for selectively inserting resistive feedback means in the operational amplifier circuit when dose rate measurement is desired, said switch means further having at least one dose position for selectively inserting capacitive feedback means in the operational amplifier circuit when total dose measurement is desired, said capacitive feedback means being charged during production of said input current, the current in said output circuit being a function of the dose rate when said switch means is in said dose rate position and a function of the dose when said switch is in said dose position; wherein said detecting means is an ionization chamber and said output circuit of said operational amplifier includes calibration resistors.

2. A radiation survey meter according to claim 1 wherein said operational amplifier comprises a MOSFET device.